United States Patent [19]
Pietzsch et al.

[11] 3,894,095
[45] July 8, 1975

[54] PROCESS FOR ISOLATING ARYLHYDROXY COMPOUNDS

[75] Inventors: Siegfried Pietzsch, Kelkheim, Taunus; Georg Schaffer, Hofheim, Taunus, both of Germany

[73] Assignee: Hoechst Aktiengesellschaft, Frankfurt am Main, Germany

[22] Filed: Jan. 30, 1973

[21] Appl. No.: 328,023

[30] Foreign Application Priority Data
Feb. 4, 1972   Germany............................ 2205227

[52] U.S. Cl.......... 260/620; 260/619 R; 260/621 A; 260/623 R; 260/624 A
[51] Int. Cl....................... C07c 37/22; C07c 37/24
[58] Field of Search........ 260/619 R, 621 A, 621 B, 260/621 P, 624, 620, 623 R, 628, 629

[56] References Cited
UNITED STATES PATENTS
| | | | |
|---|---|---|---|
| 1,314,138 | 8/1919 | Goodman et al. | 260/621 A |
| 1,956,570 | 5/1934 | Gallay | 260/621 A |
| 1,991,329 | 2/1935 | Mills | 260/621 P |
| 2,137,587 | 11/1938 | Poffenberger | 260/621 A |
| 2,334,488 | 11/1943 | Harris et al. | 260/621 A |

OTHER PUBLICATIONS
"Comp. Rind.", Vol. 187, pp. 346–348 (1928).

*Primary Examiner*—Bernard Helfin
*Assistant Examiner*—Norman Morganstern
*Attorney, Agent, or Firm*—Curtis, Morris & Safford

[57] ABSTRACT

Arylhydroxy compounds and aqueous alkali metal hydroxide solutions are separated and isolated from aqueous solutions of alkali metal arylates by extracting at a temperature of from 15° to 150°C. an aqueous solution containing the alkali metal arylate with a ketone immiscible or incompletely miscible with water at room temperature, separating the organic phase from the aqueous phase containing the alkali metal hydroxide, and isolating the free arylhydroxy compound from the organic phase by removing the ketone used as solvent.

4 Claims, 1 Drawing Figure

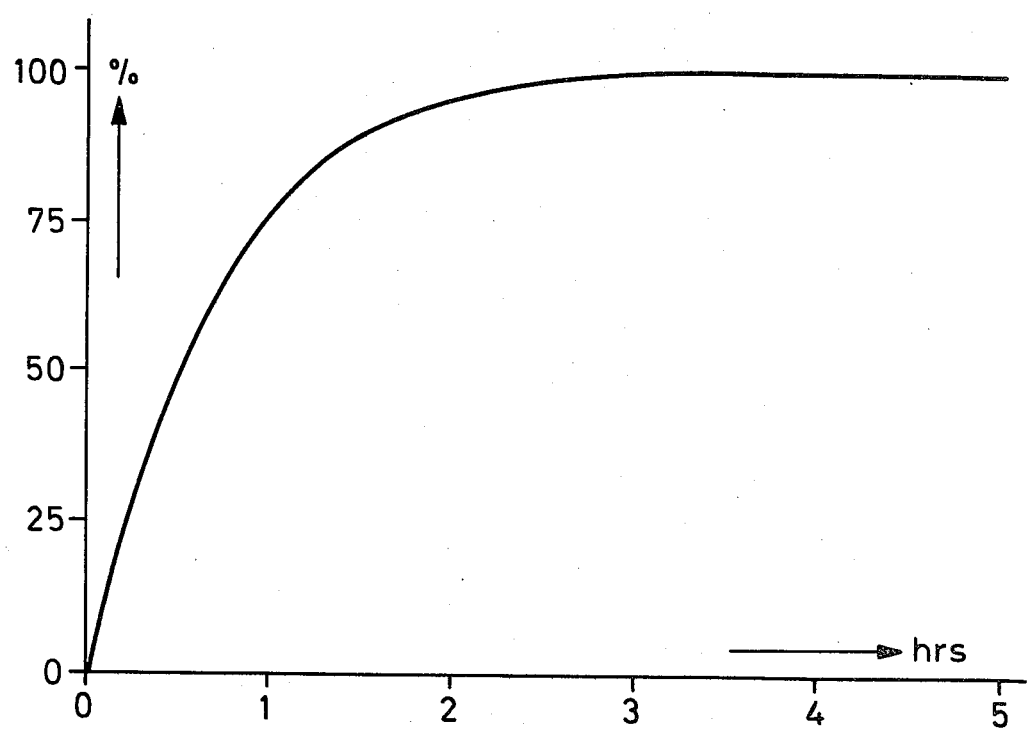

PROCESS FOR ISOLATING ARYLHYDROXY COMPOUNDS

The present invention relates to a process for isolating arylhydroxy compounds from solutions of alkali metal arylates using a ketone as extracting agent.

It is known to isolate aromatic hydroxy compounds, for example phenols and naphthols, from aqueous alkali metal arylates solutions by adjusting the pH of the solution at a value equal to or smaller than 7 by adding an acid and isolating the arylhydroxy compound, for example by filtration or extraction. In this process the alkali metal is converted into the corresponding salt by the acid used for neutralizing or acidifying the solution.

In industry, β-naphthol, for example, is set free from its aqueous sodium naphtholate solution by neutralization with sulfur dioxide, and isolated. In this process sodium sulfite is formed besides the β-naphthol set free. The sodium sulfite is reacted, in the form of an aqueous solution, with sulfuric acid to recover sulfur dioxide, whereby a sulfuric acid sodium hydrogen sulfate solution is obtained which involves sewage problems. Moreover, in the said process the phenolic compound is obtained by neutralization of the alkali metal arylate so that the sodium hydroxide is lost for further reactions or other processes.

It is also known that a series of phenolic compounds, for example mono- and dialkyl phenols and α- and β-naphthols, can be isolated to a definite extent from their aqueous alkaline solution by a treatment with diethyl ether (cf. Comptes Rendues 187 (1928), pages 346–348). In this process a molar aqueous solution of the sodium phenolate or naphtholate is stirred at 15°C with two times the volume of diethyl ether and the ether extract obtained is worked up. In this manner 15 percent of α-naphthol or 23 percent of β-naphthol have been extracted from the mixtures. A prerequisite to this extraction process is the hydrolysis of the alkali metal phenolate or naphtholate according to the following chemical equilibrium:

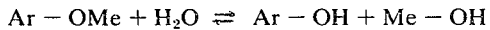

$$Ar - OMe + H_2O \rightleftarrows Ar - OH + Me - OH$$

Due to this hydrolysis, part of the arylhydroxy compound is present in the alkaline solution as free hydroxy compound. By an excess of alkali the hydrolysis according to the above equation is substantially suppressed so that the alkaline solution only contains small amounts of free hydroxy compound and hence, the extraction with diethyl ether gives very low yields. According to the equilibrium only a partial hydrolysis takes place and, therefore, it is obvious to the expert that a complete extraction of the phenols or naphthols from their aqueous alkali metal arylate solutions is impossible or is possible only with extremely high expenditure of work and time, the more so as by the extraction the relative proprotion of the alkali metal hydroxide necessarily increases and the equilibrium as shown above is shifted further to the left.

Knowing the article in Comptes Rendues it was surprising to the expert that the use of ketones instead of diethyl ether yields fully satisfactory results.

The present invention provides a process for separating and isolating arylhydroxy compounds and aqueous alkali metal hydroxide solutions from aqueous solutions of alkali metal arylates, which comprises extracting, at a temperature in the range of from 15°C to 150°C, an aqueous solution containing the alkali metal arylate with a ketone immiscible or incompletely miscible with water at room temperature, separating the organic phase from the aqueous phase, eliminating small quantities, if any, of alkali metal hydroxide from the organic phase by washing with water, and isolating the free arylhydroxy compound from the organic phase by removing the ketone used as solvent.

The extraction according to the invention is carried out once or repeatedly, if desired exhaustively, either in a cycle process or in countercurrent flow, preferably at a temperature in the range of from 20° to 120°C, more preferably the boiling point of the ketone used or the boiling point of its azeotropic mixture with water.

It has been found that with regard to the distribution of the arylhydroxy compounds between the organic phase and the aqueous alkali metal arylate solution the aforesaid ketones generally have a more favorable coefficient than diethyl ether and that this distribution coefficient can be increased by raising the extraction temperature. It proved especially advantageous to operate at the boiling point of the ketone used as solvent and extracting agent or at a possible existing azeotropic boiling limit of the binary system ketone/water. It has been surprising that even with repeated extraction the distribution coefficient remains practically unchanged and a shifting of the chemical equilibrium phenolate/water towards phenol/alkali metal hydroxide has no adverse effect on the extraction result. Of course, the total alkali metal concentration in the aqueous phase will be kept as low as possible for economical reasons. Using ketones immiscible with water or miscible with water to a small extent only an exhaustive extraction of the free phenolic compound from an alkaline aqueous aqueous solution can be carried out in this manner in a relatively short period of time of from 20 minutes to at most 5 hours depending on the apparatus used. This result could not be expected in view of the state of the art cited above.

The process of the invention which permits an exhaustive extraction of the free arylhydroxy compounds from aqueous alkali metal arylate solutions in spite of the depletion of free hydroxy compounds and the alkali metal hydroxyde set free in the aqueous phase as a result thereof, further yields an aqueous alkali metal hydroxide solution practically free from phenolic compounds. By the process of the invention an alkali metal hydroxide solution can be obtained the arylate content of which is below 0.01 percent by weight, less than 0.1 percent of the arylate originally present in the aqueous phase remaining behind. Consequently, the alkali metal hydroxide solution can be used for other reactions, but, in case the extraction has not been exhaustive, it is preferably used for the dissolution of alkali metal arylate for a subsequent isolation of the free hydroxy compound according to the process of the invention.

As compared with the known extraction with diethyl ether, the process of the invention has not only the advantages described above but also the decisive technical advantage that the severe safety regulations necessary for the working with diethyl ether owing to its high volatility, the connected cooling problems, its easy inflammability and the resulting extremely high danger of explosion, can be dispensed with. Moreover, the extraction with the ketones can be performed at much higher temperatures which ensure a higher extraction rate and a better yield.

The present process is especially suitable for working up and isolating α- or β-naphthol from naphtholate melts according to the conventional naphthol process wherein the sodium salt of naphthalene-sulfonic acid is reacted with caustic soda. In this case the present process allows of the complete recovery of one half of the caustic soda used for the melting process, while the other half is used for binding the sulfonic acid radical in the form of sulfite.

The process of the invention offers decisive advantages also for the younger naphthol process according to Hock wherein isopropyl naphthalene is transformed into acetone and naphthol by oxidation and subsequent splitting of the peroxide. The naphthol is separated from the unreacted isopropyl naphthalene by extraction with aqueous sodium hydroxide solution and no longer by distillation. In the subsequent extraction according to the invention of the free naphthol from the alkaline solution the sodium hydroxide solution, used for dissolving and separating the naphthol from isopropyl naphthalene, can be recovered practically without loss and reused in a cycle process for separating naphthol from unreacted isopropyl naphthalene.

Compounds that can be extracted according to the invention are practically all monohydroxy-aryl compounds which do not contain further ionic or ionogenic groups. There are mentioned, in the first place, α- and β-naphthol, the alkyl and especially methyl and ethyl compounds thereof; chloronaphthols; as mononuclear compounds phenol, methyl- and ethyl-phenols, mono- and polysubstituted chlorophenols and phenol compounds containing an additional aromatic nucleus. The process is unsuitable for those phenolic compounds which carry a further phenolic hydroxy group, a sulfonic acid group, or another group rendering soluble in water.

Suitable solvents or extracting agents are all liquid and solid ketonic compounds having a boiling point above 75°C and, as the extraction can be carried out also at temperatures up to 150°C, optionally under pressure, a melting point preferably below 120°C, more preferably of at most 100°C. The ketones should be immiscible with water or miscible with water to a small extent only, as upper limit of the water absorption of the ketone a value of 15 percent at 25°C being considered. Especially favorable results are obtained, however, with a ketone which dissolves less than 5 percent by weight of water at 25°C. Ketones of this type are, for example, carbonyl compounds containing straight chain or branched alkyl radicals, phenyl radicals or cyclic aliphatic rings. More particularly, there can be used araliphatic ketones such as acetophenone; aromatic ketones, for example benzophenone; cyclic ketones, such as cycloheptanone or isophorone, preferably the purely aliphatic ketones with saturated or unsaturated alkyl radicals. The ketones may contain up to 17 carbon atoms. There are preferred and especially suitable ketones of the linear or branched aliphatic series having 4 to 12 carbon atoms, for example diethyl-ketone, methylisobutyl-ketone, di-n-propyl-ketone, diisopropyl-ketone, ethyl-n-butyl-ketone, methyl-tert.butyl-ketone, diisobutyl-ketone or decanone-(2).

To carry out the process of the invention the phenolic solution, prepared, for example, by dissolution of the alkali metal phenolate or alkali metal naphtholate in water, is stirred or shaken with a ketone at room temperature or slightly elevated temperature, and the organic phase enriched with the free hydroxy compound is separated. If desired, the extraction is repeated once or several times with fresh ketone, optionally until the aqueous alkali metal phenolate or naphtholate solution is exhausted. After separation of small amounts of sodium hydroxide remaining in the organic phase, if any, the combined organic phases are briefly washed once with water and the organic solvent is distilled off. It is more advantageous, however, to perform the extraction at higher temperatures, for example at the boiling point of the solvent or its azeotrope with water. In this case, the hot extraction solution (organic phase) is separated from the aqueous phase at a temperature just below the boiling point of the former. The extraction can be carried out not only at boiling temperature and atmospheric pressure, but also in an autoclave. After deaeration the hot organic ketone phase is separated and worked up as described above. It is especially advantageous, however, to carry out the extraction in a cycle process or in countercurrent flow as known in industry. In such a process, high conversion rates and practically quantitave extraction yields of free hydroxy compound can be obtained in a relatively short period of time, in general 20 minutes to at most 4 to 5 hours, with complete exhaustion of the aqueous phase with regard to the phenolic compound and, consequently with recovery of pure sodium hydroxide solution.

The free phenolic compounds isolated by the process of the invention are obtained in a relatively pure form. For further purification a simple distillation as used in industry is sufficient.

The following examples illustrate the invention.

EXAMPLE 1

31 Grams of a product obtained from an alkali melt and containing 12.6 grams of sodium sulfite besides 16.6 grams of sodium β-naphtholate were dissolved in 150 grams of water. The solution was treated with 150 grams of ethyl-n-butyl-ketone, while stirring well, for 15 minutes with reflux (azeotropic at 96°C). The hot ketone phase was separated and quickly shaken once with 30 ml water. After distillation of the solvent, 4.5 grams of β-naphthol were obtained, from which a distribution coefficient of 0.45 was calculated.

EXAMPLE 2

(comparative example)

The same amount of the product used in Example 1 was dissolved in 150 grams of water and the solution was extracted with 150 grams of diethyl ether for 15 minutes while vigorously stirring with reflux (boiling temperature 35°C). After separation of the warm ether phase and working up of the organic phase as described in Example 1, 2.0 grams of β-naphthol were obtained. (distribution coefficient 0.17).

EXAMPLE 3

A solution of 19.2 grams of sodium-[diphenyl-hydroxylate-(2)] in 150 grams of water were stirred for 15 minutes at boiling temperature (azotropic at 87°C) with 150 grams of methyl-isobutyl-ketone. The organic phase was separated, while hot, quickly shaken once with 30 ml water, and the solvent was distilled off. 13.2 Grams of 2-hydroxy-diphenyl were obtained (melting point 58°C), corresponding to a distribution coefficient of 3.48.

EXAMPLE 4

(comparative example)

According to the process described in Comptes Rendues a solution of 19.2 grams of sodium-[diphenyl-hydroxylate-2)] in 150 grams of water was stirred for 15 minutes at room temperature with 150 grams of diethyl ether. The organic phase was worked up as indicated in Example 3. It contained 10.1 grams of 2-hydroxy-diphenyl as extract (melting point 58°C), corresponding to a distribution coefficient of 1.46.

EXAMPLE 5

A solution of 130 grams of sodium β-naphtholate in 1.600 grams of water was continuously extracted for 3 hours with methyl-isobutyl-ketone at boiling temperature (azeotropic at 87°C). The extraction was carried out in such a manner that the organic phase was slightly stirred with the aqueous phase under boiling conditions. The organic phase containing β-naphthol separated over an over-flow. It was continuously distilled in a connected distilling flask and the distillate (ketone) was recycled into the extraction vessel. 110 Grams of β-naphthol having a melting point of from 116° to 120°C were obtained.

EXAMPLE 6

A plurality of extractions were performed under the conditions of Example 5 with different extraction times and in each case the extracted amount of β-naphthol was determined. An extraction curve depending on time was determined as shown in the accompanying drawing. It results from the curve that after 2 hours about 94 percent of the amount of β-naphthol originally contained in the alkaline phase were obtained. As indicated in Example 5, a yield of about 98 percent was obtained after 3 hours, corresponding to 110 grams of β-naphthol. A practically exhaustive extraction of the aqueous alkaline phase was obtained after about 5 hours with a yield of β-naphthol of 113 grams, melting at 116°–120°C. In the aqueous phase remained the equivalent amount of sodium hydroxide set free, which can be determined by potentiometric titration.

EXAMPLE 7

234 Grams of a product from an alkali metal containing 130 grams of sodium β-naphtholate and 99 grams of sodium sulfite were dissolved in 1,600 grams of water and the solution was extracted three times under the conditions of Example 1 or 3, each time with 1,600 grams of diethyl-ketone at an azeotropic boiling point of 85°C, each extraction step being performed for 30 minutes while stirring well.

The following extraction results were obtained.

| Extraction No. | extract g | melting point °C | distribution coefficient "organic phase/"aqueous phase |
|---|---|---|---|
| 1 | 54 | 114 – 118 | 0.92 |
| 2 | 28 | 116 – 120 | 0.90 |
| 3 | 15 | 119 – 120 | 0.94 |

Of the theoretical amount of 113 grams of β-naphthol used in the form of naphtholate thus a total amount of 97 grams were isolated by an extraction in three stages. By acidifying the alkaline aqueous phase and extraction with diethyl-ketone a residual amount of 16 grams of β-naphthol could be isolated.

To illustrate the process of the invention further extraction examples are summarized in the following table, which also contains Examples 1 to 7 for a complete survey.

In the table the solvents are characterized by the following abbreviations:

| | | | |
|---|---|---|---|
| DEE | diethyl ether | MIBK | methyl isobutyl-ketone |
| DIBK | diisobutyl-ketone | MTBK | methyl-tert.butyl-ketone |
| ENBK | ethyl-n-butyl-ketone | DEK | diethyl-ketone |

| | Compounds and amounts used | | | | | | | | results | |
|---|---|---|---|---|---|---|---|---|---|---|---|
| Ex. No. | hydroxy compound | amount (g) | NaOH (g) | Na₂SO₃ content from naphthol melt (g) | H₂O (g) | solvent | amount | temp °C | time min | extracted amount g | distribution coefficient |
| | | | | | | | | | | *) | **) |
| 8+) | β-naphthol | 1.4 | 0.4 | — | ~10 | DEE | 14 | 15 | ~10 | 0.3 | 0.21 |
| 9 | β-naphthol | 14.4 | >4.0 | 12.6 | 150 | MIBK | 150 | 20 | 15 | 2.2 | 0.18 |
| 10 | β-naphthol | 14.4 | >4.0 | 12.6 | 150 | DEE | 150 | 20 | 15 | 1.3 | 0.10 |
| 11 | β-naphthol | 113 | >31 | — | 1600 | MIBK | 1600 | 87 | 30 | 47 | 0.71 |
| 12 | β-naphthol | 14.4 | >4.0 | 12.6 | 200 | DIBK | 200 | 99 | 15 | 3.8 | coefficient |
| 13 | β-naphthol | 14.4 | >4.0 | 12.6 | 200 | MIBK | 200 | 85 | 15 | 5.0 | 0.53 |
| 14 | β-naphthol | 14.4 | >4.0 | 12.6 | 200 | ENBK | 200 | 96 | 15 | 5.0 | 0.53 |
| 1 | β-naphthol | 14.4 | >4.0 | 12.6 | 150 | ENBK | 150 | 96 | 15 | 4.5 | 0.45 |
| 2 | β-naphthol | 14.4 | >4.0 | 12.6 | 150 | DEE | 150 | 35 | 15 | 2.0 | 0.17 |
| 15+) | α-naphthol | 1.4 | 0.4 | — | ~10 | DEE | 14 | 15 | ~10 | 0.2 | 0.12 |
| 16 | α-naphthol | 14.4 | 4.0 | — | 150 | MIBK | 150 | 87 | 15 | 4.6 | 0.47 |
| 17 | α-naphthol | 14.4 | 4.0 | — | 150 | DEE | 150 | 20 | 15 | 2.3 | 0.19 |
| 3 | 2-hydroxy-diphenyl | 17 | 4.0 | — | 150 | MIBK | 150 | 87 | 15 | 13.2 | 3.48 |
| 4 | 2-hydroxy-diphenyl | 17.0 | 4.0 | — | 150 | DEE | 150 | 20 | 15 | 10.1 | 1.46 |
| 18 | 4-chloro-phenol | 12.8 | 4.4 | — | 200 | MIBK | 200 | 87 | 15 | 4.7 | 0.58 |
| 19 | 2,4,5-tri-chlorophenol | 19.7 | 4.4 | — | 200 | MIBK | 200 | 87 | 15 | 4.9 | 0.33 |
| 7/1. extr | β-naphthol | 113 | 31 | 99 | 1600 | DEK | 1.6000 | 85 | 30 | 54 | 0.92 |
| 7/2. extr | β-naphthol | | 31 | 99 | 1600 | DEK | 1.6000 | 85 | 30 | 28 | 0.90 |
| 7/3. extr | β-naphthol | | 31 | 99 | 1600 | DEK | 1,600 | 85 | 30 | 15 | 0.94 |
| 5 | β-naphthol | 113 | 31 | — | 1600 | MIBK | continuously | 87 | 180 | 110 | — |
| 20 | β-naphthol | 58 | 16 | 51 | 800 | DEK | continuously | 85 | 300 | 58 | — |

+)according to Comptes Rendues 187 (1928) pages 346 et seq
*)1st extraction
**)"organic phase/"phase/" aqueous phase

We claim:

1. A process for separating and isolating arylhydroxy compounds and aqueous alkali metal hydroxide solutions from aqueous solutions of alkali metal arylates selected from the group consisting of unsubstituted phenolates and naphtholates of sodium and potassium and phenolates and naphtholates of sodium and potassium, substituted on the aromatic nucleus by alkyl, phenyl or chlorine, which comprises: extracting an aqueous solution containing the said alkali metal arylate, at a temperature in the range of from 15°C to 150°C, with a ketone selected from the group consisting of diethyl-ketone, methylisobutyl-ketone, di-n-propyl-ketone, diisopropyl-ketone, ethyl-n-butyl-ketone, methyl-tert.butyl-ketone, diisobutyl-ketone, decanone-2, acetophenone, benzophenone, cycloheptanone, isophorone, and mixtures thereof; separating the organic phase from the aqueous phase; eliminating small quantities, if any, of alkali metal hydroxide from the organic phase by washing with water; and isolating the free arylhydroxy compound from the organic phase by removing the ketone.

2. The process of claim 1, wherein the extraction is carried out at a temperature of from 20° to 120°C.

3. The process of claim 1, wherein the extraction is carried out at the boiling temperature of the ketone used or of its aqueous azeotropic mixture.

4. The process of claim 1, wherein the extraction is carried out until the aqueous alkali metal hydroxide solution is practically free from arylhydroxy compounds.

* * * * *